US012339346B2

(12) United States Patent
Han et al.

(10) Patent No.: US 12,339,346 B2
(45) Date of Patent: Jun. 24, 2025

(54) METHOD AND APPARATUS FOR INTEROPERATING WITH VEHICLE VIA UWB COMMUNICATION

(71) Applicant: Samsung Electronics Co., Ltd., Gyeonggi-do (KR)

(72) Inventors: Manho Han, Gyeonggi-do (KR); Junggil Kim, Gyeonggi-do (KR); Hogon Park, Gyeonggi-do (KR); Seunggil Jeon, Gyeonggi-do (KR); Woosik Cho, Gyeonggi-do (KR); Sukgi Hong, Gyeonggi-do (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 330 days.

(21) Appl. No.: 17/864,584

(22) Filed: Jul. 14, 2022

(65) Prior Publication Data

US 2023/0016260 A1 Jan. 19, 2023

Related U.S. Application Data

(63) Continuation of application No. PCT/KR2022/009618, filed on Jul. 4, 2022.

(30) Foreign Application Priority Data

Jul. 13, 2021 (KR) .................. 10-2021-0091548

(51) Int. Cl.
*G01S 13/02* (2006.01)
*G01S 13/46* (2006.01)
(Continued)

(52) U.S. Cl.
CPC .......... *G01S 13/0209* (2013.01); *G01S 13/72* (2013.01); *H04B 17/318* (2015.01); *G01S 2013/466* (2013.01)

(58) Field of Classification Search
None
See application file for complete search history.

(56) References Cited

U.S. PATENT DOCUMENTS 10,926,738 B1   2/2021  Tucci et al.
2008/0258868 A1  10/2008  Nakajima et al.
(Continued)

FOREIGN PATENT DOCUMENTS

CN    108020851 A   5/2018
CN    112991582 A   6/2021
(Continued)

OTHER PUBLICATIONS

International Search Report dated Oct. 19, 2022.
European Search Report dated Jul. 26, 2024.
Extended European Search Report dated Oct. 28, 2024.

*Primary Examiner* — Whitney Moore
(74) *Attorney, Agent, or Firm* — Cha & Reiter, LLC

(57) ABSTRACT

An embodiment of the disclosure provides an apparatus that include a communication module, a memory, a processor operatively connected to at least one of the communication module or the memory. The processor may be configured to perform UWB communication with a plurality of anchors included in a vehicle via the communication module according to a first scheme, to determine whether a distance to the vehicle falls within a predetermined distance by measuring the distance via the UWB communication, to determine whether a predetermined condition is satisfied if the distance falls within the predetermined distance, and if the predetermined condition is satisfied, to change the UWB communication scheme from the first scheme to a second scheme. Other embodiments are possible.

12 Claims, 10 Drawing Sheets

(51) Int. Cl.
    *G01S 13/72*      (2006.01)
    *H04B 17/318*    (2015.01)

(56)                References Cited

U.S. PATENT DOCUMENTS

| | | |
|---|---|---|
| 2015/0016488 A1 | 1/2015 | McLaughlin et al. |
| 2017/0054842 A1 | 2/2017 | Choi |
| 2018/0099643 A1 | 4/2018 | Golsch et al. |
| 2018/0188349 A1 | 7/2018 | Lee et al. |
| 2019/0061685 A1 | 2/2019 | Lee |
| 2019/0061686 A1 | 2/2019 | Neuhoff et al. |
| 2019/0135229 A1 | 5/2019 | Edvina et al. |
| 2020/0363524 A1* | 11/2020 | Yoon ................ H04W 12/069 |
| 2021/0179022 A1 | 6/2021 | Hasegawa et al. |
| 2022/0001836 A1 | 1/2022 | Baek et al. |
| 2022/0361137 A1 | 11/2022 | Baek et al. |

FOREIGN PATENT DOCUMENTS

| | | |
|---|---|---|
| KR | 10-2017-0022752 A | 3/2017 |
| KR | 10-2018-0077479 A | 7/2018 |
| KR | 10-2020-0005973 A | 1/2020 |
| KR | 10-2020-0031160 A | 3/2020 |
| KR | 10-2020-0049269 A | 5/2020 |
| WO | 2019/225431 A1 | 11/2019 |
| WO | 2021/040489 A1 | 3/2021 |
| WO | 2021/118214 A1 | 6/2021 |

* cited by examiner

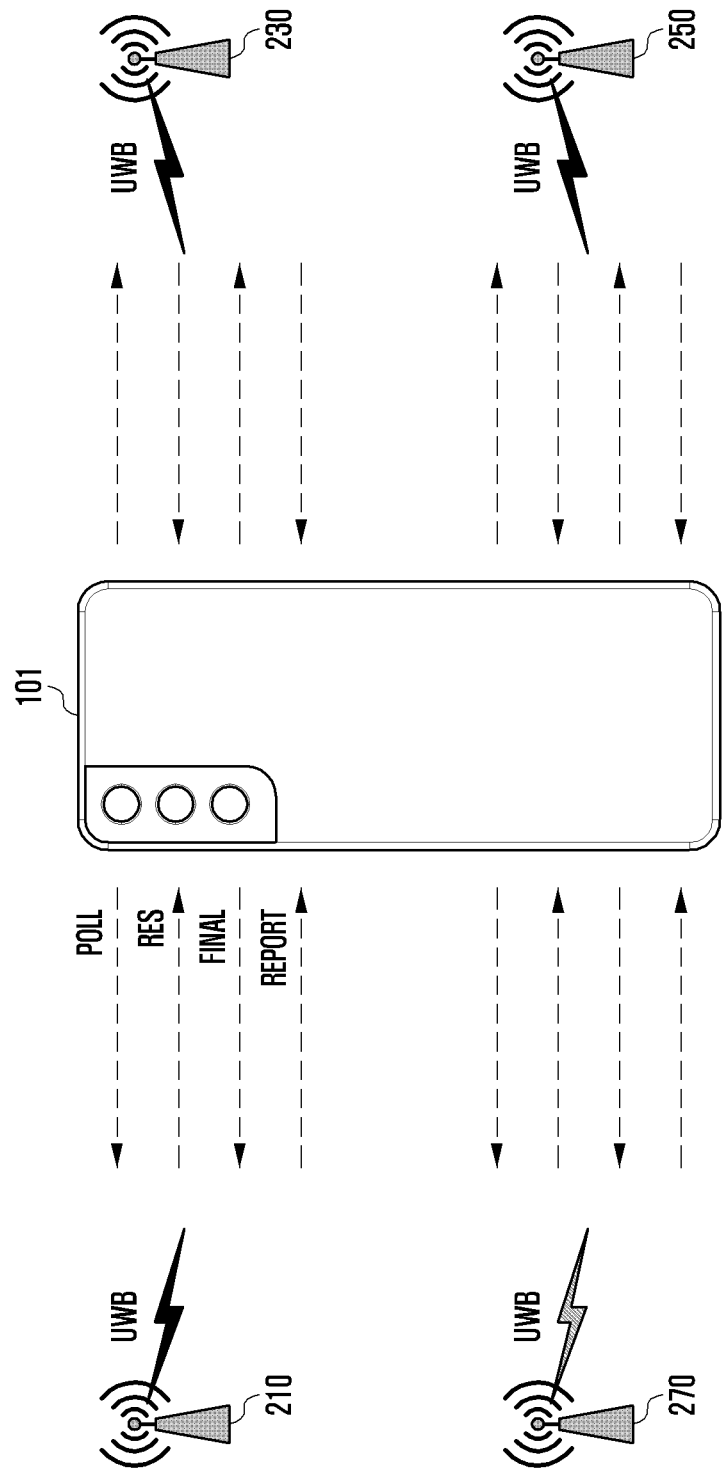

METHOD AND APPARATUS FOR INTEROPERATING WITH VEHICLE VIA UWB COMMUNICATION

CROSS-REFERENCE TO RELATED APPLICATION(S)

This application is a continuation and is based on and claims priority under 35 U.S.C. § 120 to PCT International Application No. PCT/KR2022/009618, which was filed on Jul. 4, 2022, and claims priority to Korean Patent Application No. 10-2021-0091548, filed on Jul. 13, 2021, in the Korean Intellectual Property Office, the disclosure of which are incorporated by reference herein their entirety.

BACKGROUND

Technical Field

One or more embodiments of the instant disclosure generally relate to method and apparatus for an electronic device interoperating with a vehicle via UWB communication.

Description of Related Art

Recently, with the development of digital technologies, various types of electronic devices are being widely utilized, such as mobile communication terminals, personal digital assistants (PDA), electronic organizers, smartphones, tablet personal computers (PC), wearable devices, and the like. Further, hardware and/or software of these electronic devices have been continuously improved in order to support and expand the functions of the electronic devices.

A smart key system is a system that detects a required action using a system embedded in a vehicle when a driver takes the required action while carrying a smart key, and controls the operation of the vehicle. The smart key system may be implemented as a remote keyless system (RKE system) or a passive keyless system (PKE system). The RKE system may be capable of remotely opening or closing the doors of the vehicle wirelessly, without using a physical key that is inserted into the doors to open or close them. The PKE system may enable the driver or the owner of the vehicle to unlock or lock the doors of the vehicle, to turn on the vehicle, and the like wirelessly while the driver is in proximity to the vehicle. Here, the smart key may be referred to as a "FOB key," and recently, an electronic device such as a smartphone may be utilized as a smart key.

SUMMARY

If an electronic device is utilized as the smart key, the electronic device may periodically communicate with an anchor (or anchor device) included in the vehicle. If the electronic device is located inside the vehicle, the electronic device may periodically communicate with the vehicle or its anchor and thus, the amount of current consumed by the electronic device may be increased.

An electronic device according to an embodiment of the disclosure may include a communication module, a memory, and a processor operatively connected to at least one of the communication module or the memory, wherein the processor is configured to perform UWB communication with a plurality of anchors included in a vehicle via the communication module according to a first scheme, to determine whether the distance to the vehicle falls within a predetermined distance by measuring the distance via the UWB communication, to determine whether a predetermined condition is satisfied if the distance falls within the predetermined distance, and if the predetermined condition is satisfied, to change the UWB communication scheme from the first scheme to a second scheme.

An operation method of an electronic device according to an embodiment of the disclosure may include an operation of performing UWB communication with a plurality of anchors included in a vehicle via a communication module of the electronic device according to a first scheme, an operation of determining whether the distance to a vehicle falls within a predetermined distance by measuring the distance via the UWB communication, an operation of determining whether a predetermined condition is satisfied if the distance falls within the predetermined distance, and changing the UWB communication scheme from the first scheme to a second scheme if the predetermined condition is satisfied.

Additional aspects will be set forth in part in the description which follows and, in part, will be apparent from the description, or may be learned by practice of the presented embodiments.

BRIEF DESCRIPTION OF DRAWINGS

The above and other aspects, features, and advantages of certain embodiments of the present disclosure will be more apparent from the following description taken in conjunction with the accompanying drawings, in which:

FIG. 4A is a diagram illustrating an example of performing UWB communication according to a TWR scheme by an electronic device according to an embodiment;

DETAILED DESCRIPTION

According to certain embodiments, there is provided a method and apparatus for changing a communication scheme of an electronic device so as to reduce the amount of current consumed by the electronic device if the electronic device is located inside a vehicle when communicating with an anchor included in the vehicle according to UWB communication.

According to certain embodiments, if the electronic device is located inside the vehicle when performing UWB communication with an anchor included in the vehicle, the electronic device can change the UWB communication scheme so as to reduce the amount of current consumed by the electronic device.

According to certain embodiments, if the electronic device is located outside the vehicle, the electronic device may perform UWB communication according to the two way ranging (TWR) scheme in order to measure the distance to the vehicle. However, if the electronic device is located inside the vehicle, UWB communication may be performed according to the time difference of arrival (TDOA) scheme so as to reduce the amount of current, rather than to accurately measure the distance, since the purpose is to maintain communication with the vehicle.

According to certain embodiments, at least two anchors are included in a vehicle, and the anchors are connected wirelessly or via a wire. Accordingly, the electronic device can perform UWB communication with the vehicle in the TDOA scheme without additional cost.

Figure 1:
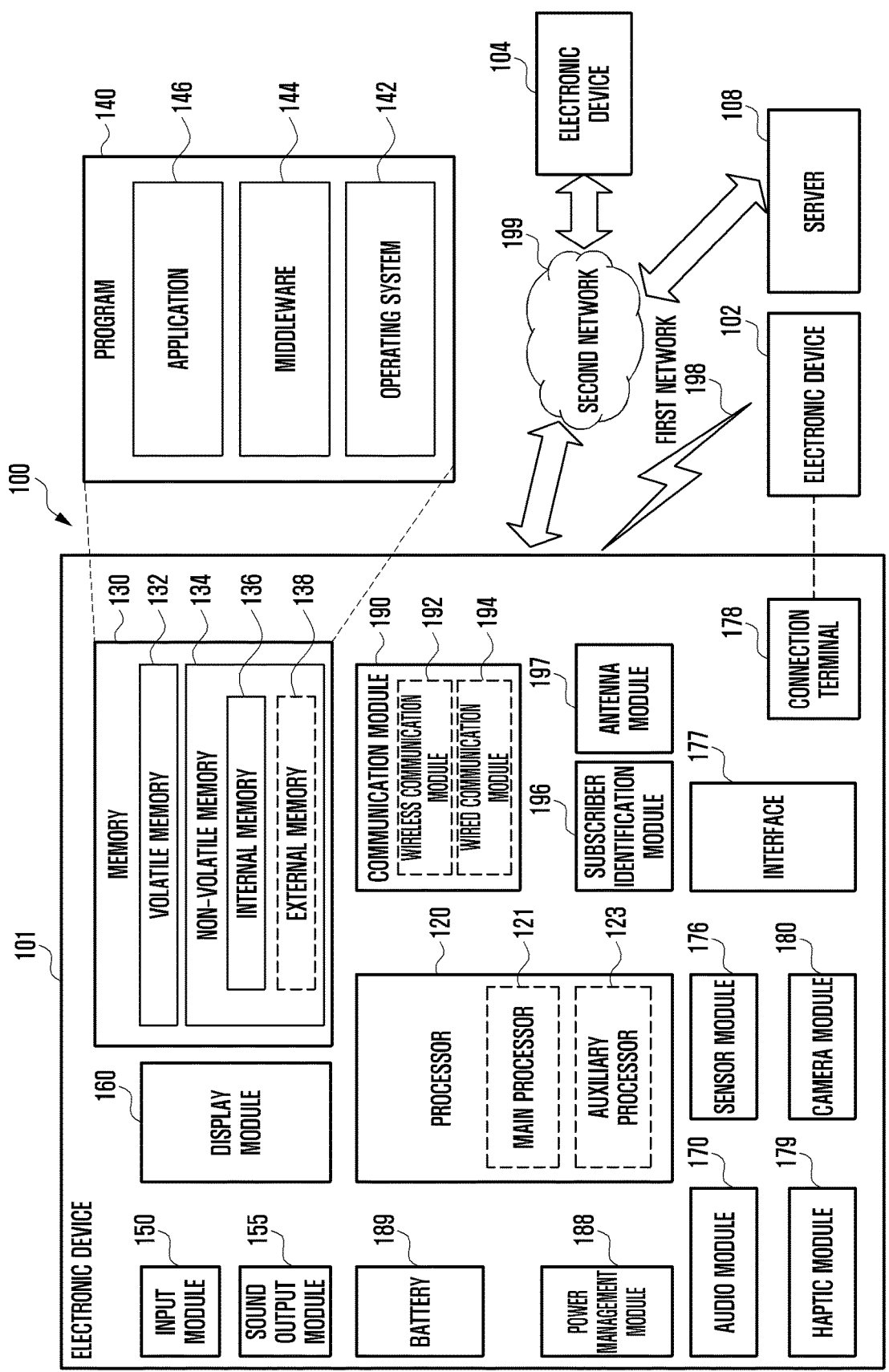
FIG. 1 is a block diagram illustrating an electronic device in a network environment according to an embodiment.

FIG. 1 is a block diagram illustrating an electronic device 101 in a network environment 100 according to certain embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to certain embodiments, the antenna module 197 may form a mmWave antenna module. According to an embodiment, the mmWave antenna module may include a printed circuit board, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Figure 2:
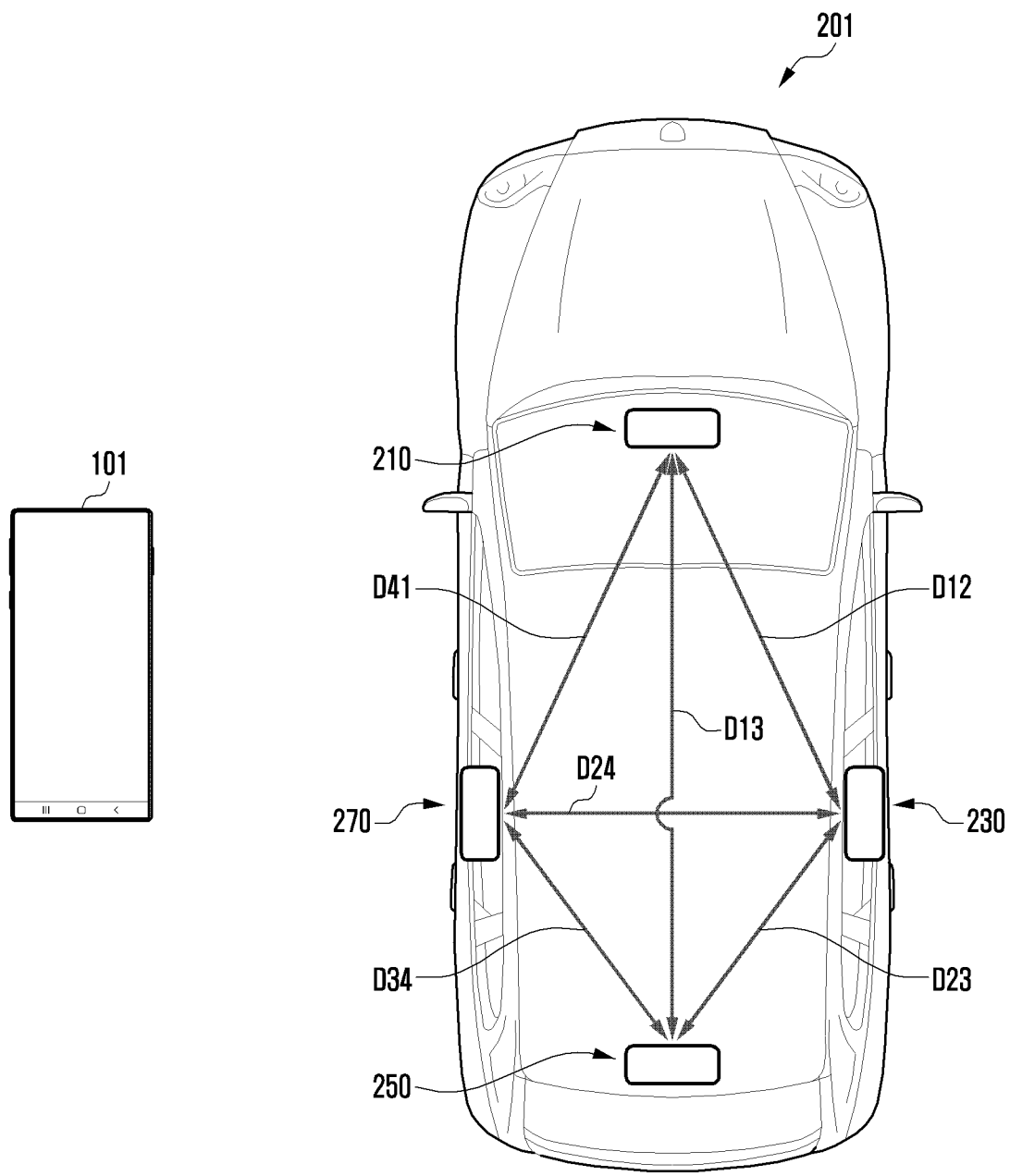
FIG. 2 is a diagram illustrating a network environment between a vehicle and an electronic device according to an embodiment.

FIG. 2 is a diagram illustrating a network environment between a vehicle and an electronic device according to an embodiment.

Referring to FIG. 2, an electronic device (e.g., the electronic device 101 of FIG. 1) according to an embodiment may perform ultra wide band (UWB) communication with an anchor (e.g., first anchor 210 to fourth anchor 270) included in a vehicle 201. The vehicle 201 may include a smart key system that detects a required action. And if a driver takes the required action while having a smart key, the smart key system may control the operation of the vehicle according to the required action. The smart key system may include an antenna for transmitting or receiving signals and/or a controller that controls overall operation of the vehicle 201. Each of the first anchor 210 to the fourth anchor 270 of FIG. 2 may include an RF antenna that performs transmission or reception of ultra wide band (UWB) signals (e.g., radio frequency (RF) signals) with a smart key (e.g., the electronic device 101). Here, the smart key may be implemented using software stored in the electronic device 101. The first anchor 210 to the fourth anchor 270 may be connected to each other via a wire or wirelessly.

For example, an RF antenna may transmit a UWB signal to the electronic device 101, and may receive a UWB signal from the electronic device 101. The first anchor 210 to the fourth anchor 270 may be disposed inside or outside the vehicle 201. The locations of the first anchor 210 to the fourth anchor 270 illustrated in the drawing are merely an example, and the disclosure is not limited thereto. Although it is illustrated that four anchors are included in the vehicle 201 in the drawing, a smaller number of anchors (e.g., two anchors) than four anchors or four or more anchors may be included in the vehicle 201. The above-description is merely provided as examples, and the disclosure is not limited thereto.

If the electronic device 101 is located outside the vehicle 201, the electronic device 101 may measure the distance to the vehicle 201 while performing UWB communication with at least two of the first anchor 210 to fourth anchor 270 of the vehicle 201. UWB communication may be technology that measures the positions between two devices by using two way ranging (hereinafter referred to "TWR"). The TWR scheme may include a single side TWR (SS-TWR) scheme or a double side TWR (DS-TWR) scheme. According to the SS-TWR scheme, if the electronic device 101 transmits a Ranging Poll message (or Ranging Poll data) to the vehicle 201, the vehicle 201 transmits a Ranging Response message to the electronic device 101, and the electronic device 101 may identify the distance from the vehicle 201 (or the location of the vehicle 201). According to the DS-TWR scheme, if the electronic device 101 transmits a Ranging Poll message, the vehicle 201 transmits a Ranging Response message to the electronic device 101, and the electronic device 101 transmits a Ranging Final message to the vehicle 201, and according to this communication the electronic device 101 may identify the distance from the vehicle 201.

The electronic device 101 may measure the distance to the vehicle 201 according to the TWR scheme, and may determine whether the distance to the vehicle 201 falls within a predetermined distance. If the distance to the vehicle 201 falls within the predetermined distance, the electronic device 101 may determine whether the electronic device 101 is located inside the vehicle 201. For example, if the smart key system of the vehicle 201 (e.g., the main CPU of the vehicle 201) determines whether the electronic device 101 is located inside the vehicle 201 via a localization, or if the strength of a receiver signal strength indicator (RSSI) received from the electronic device 101 corresponds to a set value, it is determined that the electronic device 101 is located inside the vehicle 201. If it is determined that the electronic device 101 is located inside the vehicle 201, the smart key system may transmit, to the electronic device 101, a signal indicating that the electronic device 101 is located inside the vehicle 201. If the electronic device 101 receives, from the vehicle 201, the signal indicating that the electronic device 101 is located inside the vehicle 201, the electronic device 101 determines that it is located inside the vehicle 201.

According to an embodiment, the electronic device 101 may determine whether the electronic device 101 is connected to a wired or wireless connection system of the vehicle 201. If the electronic device 101 was previously connected to the vehicle 201 via Bluetooth, and the vehicle 201 is turned on (the vehicle 201 is powered on) in the state in which Bluetooth is activated (e.g., Bluetooth on-state), communication between the electronic device 101 and the vehicle 201 may be connected via Bluetooth. Alternatively, if the electronic device 101 is connected to the vehicle 201 via Bluetooth, or is connected to the vehicle 201 via a wired connection system (e.g., USB connection), it is determined that the electronic device 101 is located inside the vehicle 201.

According to an embodiment, based on the distances between the electronic device 101 and at least two anchors and the distances between respective anchors, the electronic device 101 may determine whether the electronic device 101 is located inside or outside the vehicle 201. For example, the electronic device 101 may measure at least one of a first distance D1 to the first anchor 210, a second distance D2 to a second anchor 230, a third distance D3 to a third anchor 250, and a fourth distance D4 to the fourth anchor 270 via UWB communication. The electronic device 101 may obtain, from the vehicle 201, at least one of a first anchor distance D12 between the first anchor 210 and the second anchor 230, a second anchor distance D23 between the second anchor 230 and the third anchor 250, a third anchor distance D34 between the third anchor 250 and a fourth anchor 270, a fourth anchor distance D41 between the fourth anchor 270 and the first anchor 210, a fifth anchor distance D13 between the first anchor 210 and the third anchor 250, and a sixth anchor distance D24 between the second anchor 230 and the fourth anchor 270, or may measure such distances via UWB communication.

According to an embodiment, if the maximum value among the first distance D1 to the fourth distance D4 is greater than or equal to the maximum value among the first anchor distance D12 to the sixth anchor distance D24 (e.g., max[d1, d2, d3, d4]≥max[D12, D23, D34, D41, D13, D24]), it is determined that the electronic device 101 is located outside the vehicle 201. Alternatively, if the maximum value among the first distance D1 to the fourth distance D4 is less than the maximum value among the first anchor distance D12 to the sixth anchor distance D24 (e.g., max[d1, d2, d3, d4]<max[D12, D23, D34, D41, D13, D24]), it is determined that the electronic device 101 is located inside the vehicle 201. When determining the maximum value, the electronic device 101 may take into account an error range of the first distance D1 to the fourth distance D4 and an error range of the first anchor distance D12 to the sixth anchor distance D24.

If it is determined that the electronic device 101 is located inside the vehicle 201 based on at least one of a signal received from the vehicle 201 or the distances between anchors, the electronic device may change the UWB communication scheme. For example, if the electronic device 101 is located outside the vehicle 201, the electronic device 101 may perform UWB communication according to the TWR scheme. If the electronic device 101 is located inside the vehicle 201, the electronic device 101 may perform UWB communication according to a time difference of arrival (TDOA) scheme. The TDOA scheme measures the distance to the vehicle 201 based on the time spent by signals travelling from the electronic device 101 to each anchor included in the vehicle 201. The first anchor 210 to the fourth anchor 270 included in the vehicle 201 are connected to each other via a wire or wirelessly, and thus, the anchors may be synchronized in time. The electronic device 101 may transmit a Ranging Poll message to the first anchor 210 to the fourth anchor 270, and may measure the distance to the electronic device 101 using the differences in times at which the first anchor 210 to the fourth anchor 270 receive the Ranging Poll message.

According to an embodiment, although the descriptions herein relate to a vehicle, the same may be applied to other locations, such as a home. For example, authentication between an indoor system and the electronic device 101 in order to access to a predetermined space (e.g. home) may employ embodiments of the instant disclosure. The predetermined space may include a plurality of anchors, and an indoor system including the plurality of anchors may determine whether the electronic device 101 is present inside or outside the predetermined space. For example, the electronic device 101 may determine that the electronic device 101 is located inside the predetermined space if the electronic device 101 receives, from an indoor system, a signal indicating that the electronic device 101 is located inside the special space, if the electronic device 101 is connected via a wire or wirelessly to the indoor system, or may determine that the electronic device 101 is located inside the predetermined space based on distances between the electronic device 101 and at least two anchors and distances between respective anchors obtained via UWB communication.

An electronic device (e.g., the electronic device 101 of FIG. 1) according to an embodiment may include a communication module (e.g., the communication module 190 of FIG. 1), a memory (e.g., the memory 130 of FIG. 1), and a processor (e.g., the processor 120 of FIG. 1) operatively connected to at least one of the communication module or the memory, and the processor may be configured to perform UWB communication with a plurality of anchors (e.g., the first anchor 210 to the fourth anchor 270 of FIG. 2) included in a vehicle (e.g., the vehicle 201 of FIG. 2) via the communication module according to a first scheme, to determine whether the distance to the vehicle falls within a predetermined distance by measuring the distance via the UWB communication, to determine whether a predetermined condition is satisfied if the distance falls within the predetermined distance, and if the predetermined condition is satisfied, to change the UWB communication scheme from the first scheme to a second scheme.

The processor may be configured to determine, based on the predetermined condition, whether the electronic device is located inside the vehicle.

The predetermined condition may include when information indicating that the electronic device is located inside the vehicle is received from the vehicle, when the electronic device is determined as being connected to a connection system of the vehicle, and/or when the electronic device is determined as being located inside the vehicle based on another distance between anchors included in the vehicle, the processor is configured to determine that the predetermined condition is satisfied.

If the vehicle determines that the electronic device is located inside the vehicle or the strength of a receiver signal strength indicator (RSSI) that an anchor included in the vehicle receives from the electronic device corresponds to a set value, the processor may be configured to determine that the predetermined condition is satisfied by receiving, from the vehicle, a signal indicating that the electronic device is inside the vehicle.

If the electronic device is connected to the connection system of the vehicle via a wire or wirelessly, the processor may be configured to determine that the predetermined condition is satisfied.

The processor may be configured to measure a first distance to a first anchor included in the vehicle or a second distance to a second anchor via the UWB communication, to obtain an anchor distance between the first anchor and the second anchor from the vehicle, or to measure the anchor distance via the UWB communication, and to determine that the electronic device is located inside the vehicle if the maximum value among the first distance or the second distance is less than the anchor distance.

If the maximum value among the first distance or the second distance is greater than or equal to the anchor distance, the processor may be configured to determine that the electronic device is located outside the vehicle.

The processor may be configured to determine that the electronic device is located inside the vehicle if the maximum value among the first distance or the second distance is less than the anchor distance, or to determine that the electronic device is located outside the vehicle if the maximum value among the first distance or the second distance is greater than or equal to the anchor distance, while taking into account an error range of the first distance, the second distance, and/or the anchor distance.

The first scheme may be set to a two way ranging (TWR) scheme, and the second scheme may be set to a time difference of arrival (TDOA) scheme.

The processor may be configured to determine whether the predetermined condition is satisfied while performing UWB communication with the plurality of anchors included in the vehicle according to a second scheme, and if the predetermined condition is not satisfied, to change the UWB communication scheme from the second scheme to the first scheme.

Figure 3:
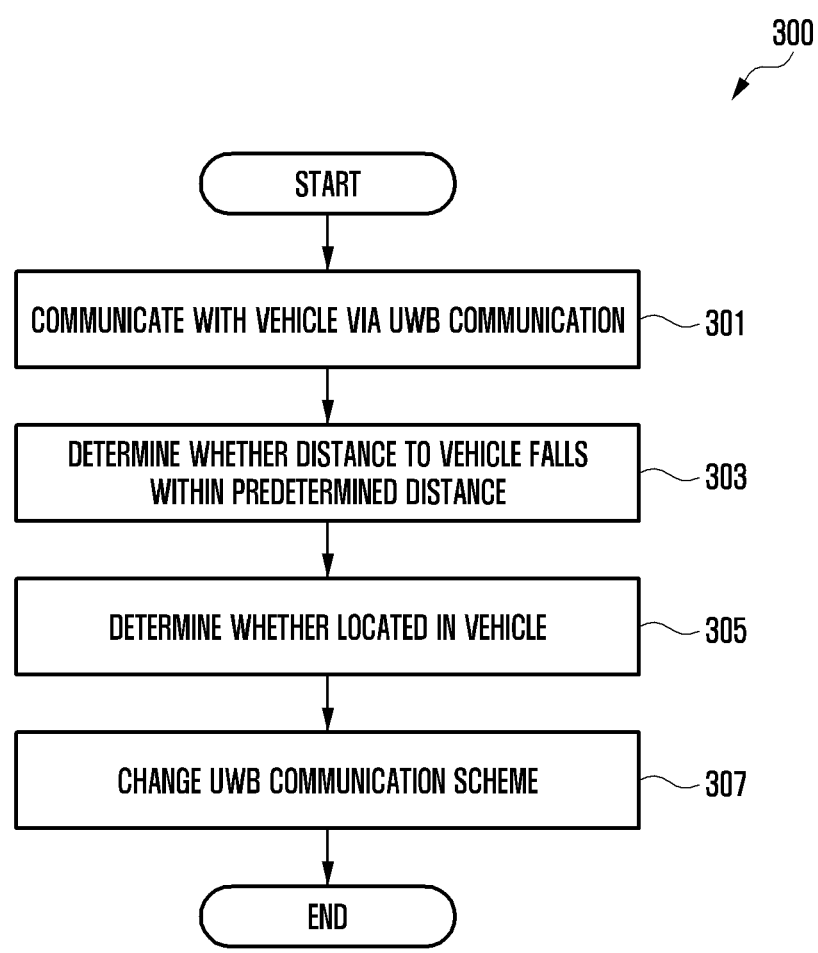
FIG. 3 is a flowchart illustrating an operation method of an electronic device according to an embodiment.

FIG. 3 is a flowchart 300 illustrating an operation method of an electronic device according to an embodiment.

Referring to FIG. 3, in operation 301, a processor (e.g., the processor 120 of FIG. 1) of an electronic device (e.g., the electronic device 101 of FIG. 1) according to an embodiment may communicate with a vehicle (e.g., the vehicle 201 of FIG. 2) via UWB communication. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means plus function, unless the element is expressly recited using the phrase "means for." In addition, an artisan understands and appreciates that a "processor" or "microprocessor" may be hardware in the claimed disclosure. The UWB communication may be used to measure the positions between two devices according to the TWR scheme. In operation 301, the electronic device 101 may be located outside the vehicle 201. The coverage area of UWB communication may be wider than that of Bluetooth communication and thus, the electronic device 101 may perform UWB communication with the vehicle 201 at a location where Bluetooth communication is not possible. If the vehicle 201 is close enough to the electronic device 101 to perform UWB communication, the processor 120 may perform UWB communication with the vehicle 201 via a communication module (e.g., the communication module 190 of FIG. 1).

In operation 303, the processor 120 may determine whether the distance to the vehicle 201 falls within a predetermined distance. The TWR scheme may include an SS-TWR scheme or a DS-TWR scheme. Hereinafter, the method of measuring the distance to the vehicle 201 according to the SS-TWR scheme will be described. The processor 120 may transmit a Ranging Poll message to the vehicle 201, and the vehicle 201 may transmit a Ranging Response message to the electronic device 101 in response to the Ranging Poll message. The Ranging Response message may include time information indicating when the vehicle 201 receives the Ranging Poll message from the electronic device 101 and time information indicating when the Ranging Response message is transmitted. The processor 120 may measure the distance to the vehicle 201 based at least one of time information indicating when the Ranging Poll message is transmitted, time information indicating when the vehicle 201 receives the Ranging Poll message, time information indicating when the Ranging Response message is transmitted, and time information indicating when the Ranging Response message is received. The predetermined distance may be a reference distance, such as 3 m, 1 m, 30 cm, or the like, for determining whether the electronic device 101 is located inside the vehicle 201. The predetermined distance may be preset in the electronic device 101 or may be set by a user.

In operation 305, if the distance to the vehicle 201 falls within the predetermined distance, the processor 120 may determine whether the electronic device 101 is located inside the vehicle 201. Whether the electronic device 101 is located inside the vehicle 201 may correspond to a predetermined condition. The predetermined condition may be, for example, when information indicating that the electronic device 101 is located inside the vehicle is received from the vehicle 201 by the electronic device 101, when the electronic device 101 is determined as being connected to a connection system of the vehicle 201, and when the electronic device 101 is determined as being located inside the vehicle based on the distances between anchors included in the vehicle 201. A smart key system of the vehicle 201 may determine whether the electronic device 101 is located inside via the localization procedures described above, or may determine whether the electronic device 101 is inside or outside the vehicle 201 by determining whether the strength of an RSSI received from the electronic device 101 corresponds to a set value. If the strength of the RSSI received from the electronic device 101 corresponds to a set value (or is satisfied), the smart key system of the vehicle 201 may determine that the electronic device 101 is located inside the vehicle 201. If it is determined that the electronic device 101 is located inside the vehicle 201, the smart key system may transmit a signal indicating that the electronic device 101 is located inside the vehicle 201. If the electronic device 101 receives, from the vehicle 201, a signal indicating that the electronic device 101 is located inside the vehicle 201, the processor 120 may determine that the electronic device 101 is located inside the vehicle 201.

According to an embodiment, the processor 120 was previously connected to the vehicle 201 via Bluetooth, and the vehicle 201 is turned on in the state in which Bluetooth is activated (e.g., Bluetooth on-state), communication may be connected with the vehicle 201 via Bluetooth automatically. Alternatively, if the processor 120 is connected to the vehicle 201 via Bluetooth, or is connected to the vehicle 201 via a wired connection system (e.g., USB connection), it is determined that the electronic device 101 is located inside the vehicle 201.

According to an embodiment, the processor 120 may determine whether the electronic device 101 is located inside or outside the vehicle 201 based on the distances between the electronic device 101 and at least two anchors included in the vehicle 201, and the distances between respective anchors. For example, the vehicle 201 may include at least one of a first anchor (e.g., the first anchor 210 of FIG. 2), a second anchor (e.g., the second anchor 230 of FIG. 2), a third anchor (e.g., the third anchor 250 of FIG. 2), and a fourth anchor (e.g., the fourth anchor 270 of FIG. 2). Although it is described that four anchors are included in the vehicle 201 in the descriptions, a smaller number of anchors (e.g., two anchors) than four anchors or four or more anchors may be included in the vehicle 201. The processor 120 may measure at least one of a first distance D1 to the first anchor 210, a second distance D2 to the second anchor 230, a third distance D3 to the third anchor 250, or a fourth distance D4 to the fourth anchor 270 via UWB communication.

The processor 120 may obtain, from the vehicle 201, at least one of a first anchor distance D12 between the first anchor 210 and the second anchor 230, a second anchor distance D23 between the second anchor 230 and the third anchor 250, a third anchor distance D34 between the third anchor 250 and the fourth anchor 270, a fourth anchor distance D41 between the fourth anchor 270 and the first anchor 210, a fifth anchor distance D13 between the first anchor 210 and the third anchor 250, and a sixth anchor distance D24 between the second anchor 230 and the fourth anchor 270, or may measure such distances via UWB communication.

If the maximum value among the first distance D1 to the fourth distance D4 is greater than or equal to the maximum value among the first anchor distance D12 to the sixth anchor distance D24, the processor 120 may determine that the electronic device 101 is located outside the vehicle 201. If the maximum value among the first distance D1 to the fourth distance D4 is less than the maximum value among the first anchor distance D12 to the sixth anchor distance D24, the processor 120 may determine that the electronic device 101 is located inside the vehicle 201. When determining the maximum value, the electronic device 101 may take into account an error range of the first distance D1 to the fourth distance D4, and an error range of the first anchor distance D12 to the sixth anchor distance D24. The error range may be preset in the electronic device 101 or may be set by the user.

In operation 307, the processor 120 may change the UWB communication scheme if the electronic device 101 is located inside the vehicle 201. The processor 120 may change the UWB communication scheme from the TWR scheme to the TDOA scheme. For example, in operations 301 to 305 in which the electronic device 101 is determined as being located outside the vehicle 201, the processor 120 may perform UWB communication with the vehicle 201 according to the TWR scheme. In operation 307 in which the electronic device 101 is determined as being located inside the vehicle 201, the processor 120 may perform UWB communication with the vehicle 201 according to the TDOA scheme. If the electronic device 101 is located outside the vehicle, the electronic device 101 may perform UWB communication according to the TWR scheme in order to measure the distance to the vehicle 201. If the electronic device 101 is located inside the vehicle 201, the electronic device 101 may perform UWB communication according to the TDOA scheme so as to reduce the amount of current consumed, with the tradeoff being distance measurement is not as accurate, because UWB communication while the electronic device 101 is inside the vehicle 201 is primarily concerned with maintaining communication with the vehicle 201.

FIG. 4A is a diagram illustrating an example of performing UWB communication according to a TWR scheme by an electronic device according to an embodiment.

Referring to FIG. 4A, if an electronic device (e.g., the electronic device 101 of FIG. 1) according to an embodiment is located outside a vehicle (e.g., the vehicle 201 of FIG. 2), the electronic device 101 may perform UWB communication with the vehicle 201 according to the TWR scheme. The TWR scheme may include the SS-TWR scheme or the DS-TWR scheme.

FIG. 4A illustrates an example of performing UWB communication according to the DS-TWR scheme. The vehicle 201 may include a smart key system that detects that the driver who carries the smart key has requested a required action for a system embedded in the vehicle (e.g. opening a car door), and controls the operations of the vehicle according to the required action. The smart key system may include an antenna for transmitting or receiving signals or a controller that controls overall operation of the vehicle 201. The vehicle 201 may include at least one of a first anchor (e.g., the first anchor 210 of FIG. 2), a second anchor (e.g., the second anchor 230 of FIG. 2), a third anchor (e.g., the third anchor 250 of FIG. 2), and a fourth anchor (e.g., the fourth anchor 270 of FIG. 2). Each of the first anchor 210 to the fourth anchor 270 may include an RF antenna that performs transmission or reception of RF signals (e.g., UWB signals) with the smart key (e.g., the electronic device 101).

The electronic device 101 may transmit a Ranging Poll message to the first anchor 210 to the fourth anchor 270 included in the vehicle 201. The first anchor 210 to the fourth anchor 270 may transmit a Ranging Response message to the electronic device 101 in response to the Ranging Poll message. The electronic device 101 may transmit a Ranging Final message to the first anchor 210 to the fourth anchor 270. The vehicle 201 that receives the Ranging Final message may measure the distance to the electronic device 101, and may transmit a Report message including the distance to the electronic device 101 to the electronic device 101. Alternatively, the first anchor 210 to the fourth anchor 270 included in the vehicle 201 may transmit a Ranging Poll message to the electronic device 101. The electronic device 101 may transmit a Ranging Response message to the first anchor 210 to the fourth anchor 270 in response to the Ranging Poll message. The first anchor 210 to the fourth anchor 270 may transmit a Ranging final message to the electronic device 101. The electronic device 101 that receives the Ranging final message may measure the distance to the vehicle 201.

If the electronic device 101 is located outside the vehicle 201, it is important to accurately measure the distance to the vehicle 201, and thus, the electronic device 101 may perform UWB communication with the vehicle 201 according to the TWR scheme. The TWR scheme needs to activate UWB communication while the electronic device 101 transmits messages (e.g., Ranging Poll, Ranging Final) and receives messages (e.g., Ranging Response), and thus the amount of power consumed for UWB communication may be relatively significant.

Figure 4B:
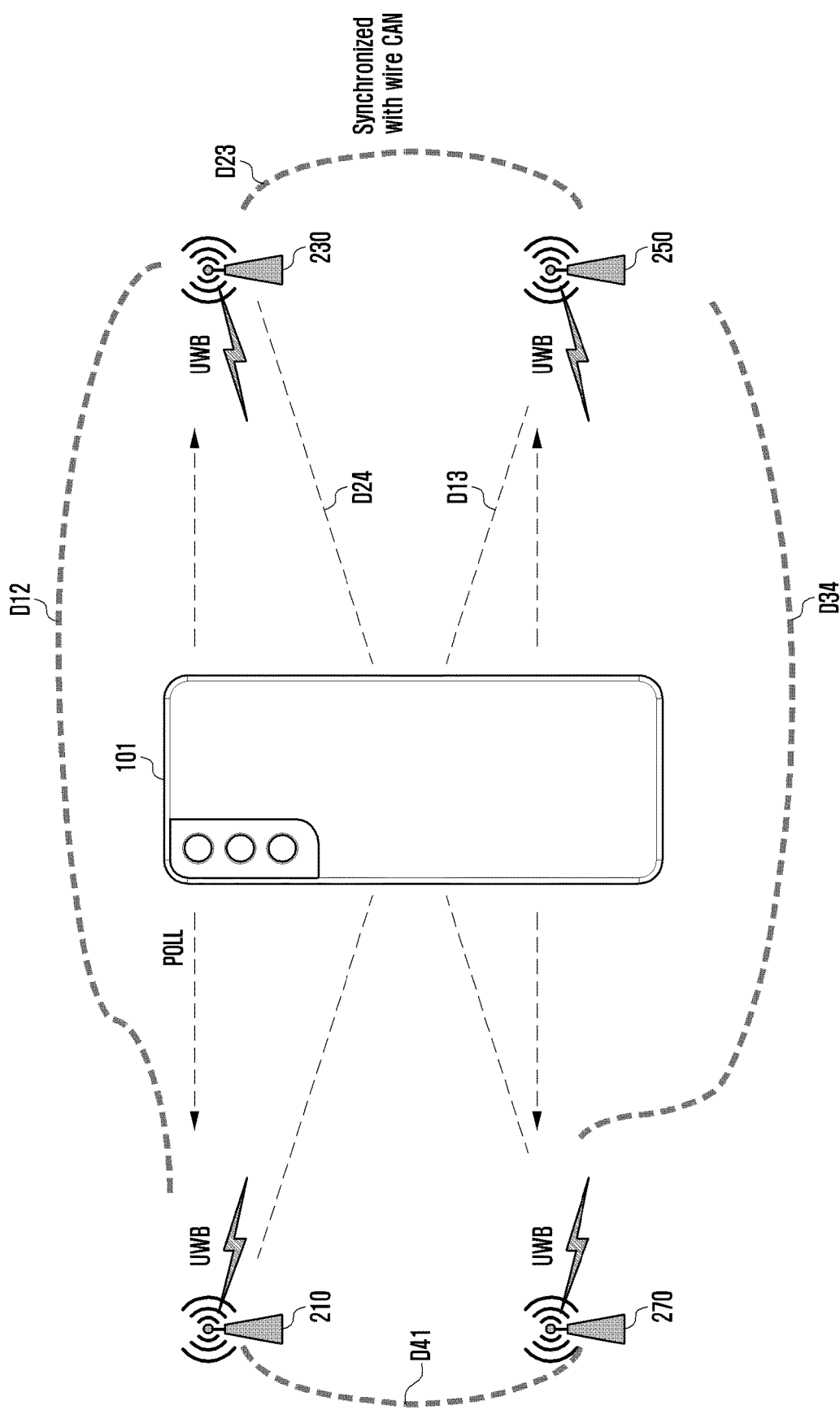
FIG. 4B is a diagram illustrating an example of performing UWB communication according to a TDOA scheme by an electronic device according to an embodiment.

FIG. 4B is a diagram illustrating an example of performing UWB communication according to the TDOA scheme by an electronic device according to an embodiment.

Referring to FIG. 4B, if the electronic device 101 is located inside the vehicle 201, the electronic device 101 may perform UWB communication with the vehicle 201 according to the TDOA scheme. The TDOA scheme may measure the distance to the vehicle 201 based on the time spent by signals travelling from the electronic device 101 to each anchor included in the vehicle 201. The first anchor 210 to the fourth anchor 270 may be connected to each other via a wire or wirelessly, and thus, the anchors may be synchronized in time. The first anchor 210 to the fourth anchor 270 may be disposed in different locations of the vehicle 201, and the times at which the first anchor 210 to the fourth anchor 270 receive signals transmitted from the electronic device 101 may be different from each other. The electronic device 101 may transmit a Ranging Poll message to the first anchor 210 to the fourth anchor 270, and may measure the distance to the electronic device 101 using the differences in time at which the first anchor 210 to the fourth anchor 270 receive the Ranging Poll message.

If the electronic device 101 is located inside the vehicle 201, the purpose may be maintaining UWB communication rather than to accurately measure the distance to the vehicle 201. The TDOA scheme activates UWB communication while the electronic device 101 transmits a message (e.g., Ranging Poll) and thus, the amount of power consumed may be smaller than the TWR scheme.

Figure 5:
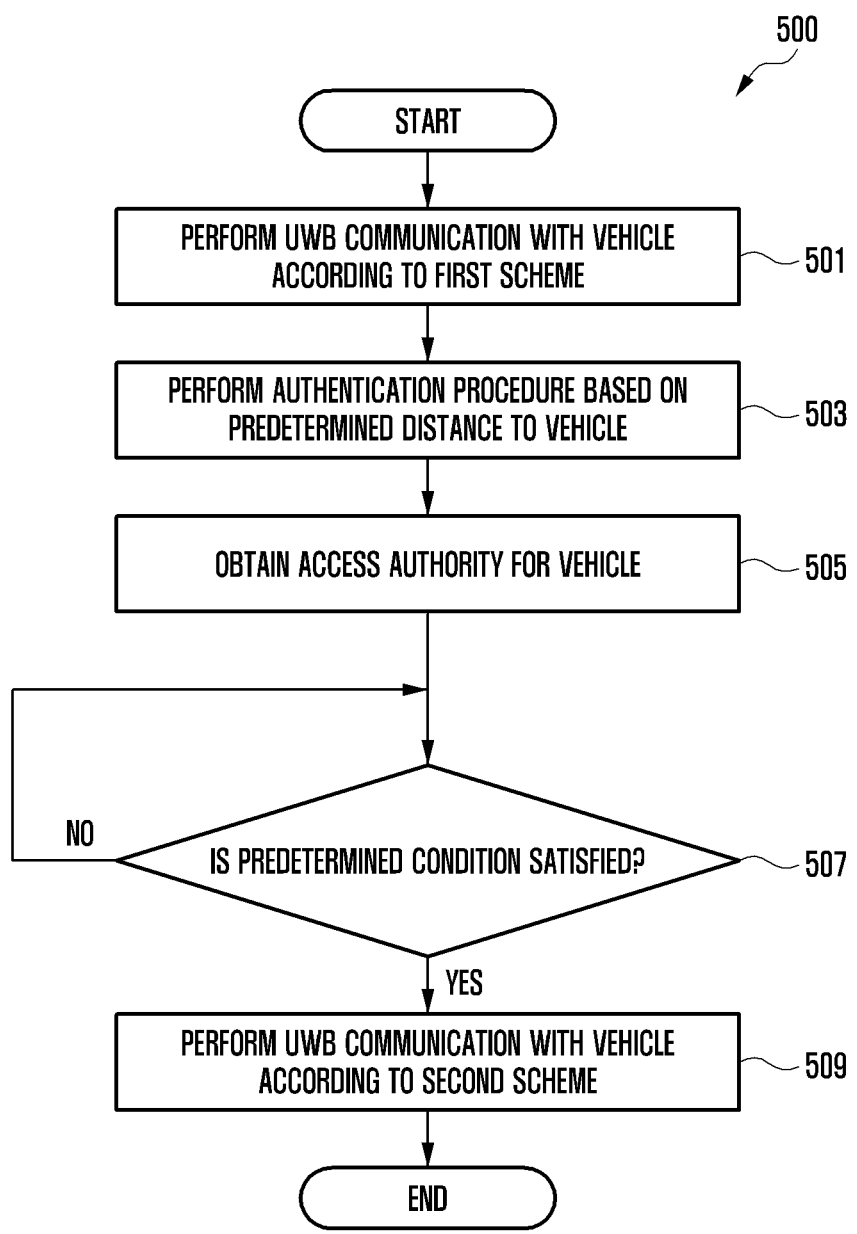
FIG. 5 is a flowchart illustrating a method of an electronic device interoperating with a vehicle via UWB communication according to an embodiment.

FIG. 5 is a flowchart 500 illustrating a method of an electronic device interoperating with a vehicle via UWB communication according to an embodiment.

Referring to FIG. 5, in operation 501, a processor (e.g., the processor 120 of FIG. 1) of an electronic device (e.g., the electronic device 101 of FIG. 1) according to an embodiment may communicate with a vehicle (e.g., the vehicle 201 of FIG. 2) according to a first scheme via UWB communication. The first scheme may be the TWR scheme. If the distance to the vehicle 201 is one where UWB communication with the vehicle 201 is enabled, the processor 120 may measure the distance to the vehicle 201 by performing UWB communication with the vehicle 201 via a communication module (e.g., the communication module 190 of FIG. 1). Operation 501 is the same as, or similar to, operation 301 of FIG. 3, and thus, detailed descriptions thereof will be omitted.

In operation 503, the processor 120 may perform an authentication procedure based on a predetermined distance to the vehicle 201. The processor 120 may determine whether the distance to the vehicle 201 falls within the predetermined distance via UWB communication, and may perform an authentication procedure if the distance to the vehicle 201 falls within the predetermined distance. The authentication procedure may involve exchanging a key (e.g., public key) assigned to the electronic device 101 and a key (e.g., private key) assigned to the vehicle 201 for registering the electronic device 101 with the vehicle 201, and verifying the keys assigned to them. This key authentication method may be conventionally known, and thus detailed descriptions thereof will be omitted.

In operation 505, if the authentication procedure is successfully performed, the processor 120 may obtain the access authority for the vehicle 201. The access authority for the vehicle 201 may be the authority to open the door of the vehicle 201, or the authority to turn on the vehicle 201. If the electronic device 101 approaches the vehicle 201, the door of the vehicle 201 may automatically open, or unlocking of the door of the vehicle 201 may be allowed. The user who has the electronic device 101 may be allowed to open the door of the vehicle 201 and turn on the vehicle 201.

In operation 507, the processor 120 may determine whether a predetermined condition is satisfied. The predetermined condition may correspond to whether the electronic device 101 is located inside the vehicle 201. For example, the predetermined condition may be when information indicating that the electronic device 101 is located inside the vehicle is received from the vehicle 201 by the electronic device 101, when the electronic device 101 is determined as being connected to a connection system of the vehicle 201, and when the electronic device 101 is determined as being located inside the vehicle based on a distance between anchors included in the vehicle 201. If the electronic device 101 receives, from the vehicle 201, a signal indicating that the electronic device 101 is located inside the vehicle 201, the processor 120 may determine that the predetermined condition is satisfied. If the processor 120 is connected to the vehicle 201 via Bluetooth, or is connected to the vehicle 201 via a wired connection system (e.g., USB connection), it is determined that the predetermined condition is satisfied. The processor 120 may determine whether the predetermined condition is satisfied based on the distances between the electronic device 101 and at least two anchors included in the vehicle 201 and distances between respective anchors.

For example, the vehicle 201 may include at least one of a first anchor (e.g., the first anchor 210 of FIG. 2), a second anchor (e.g., the second anchor 230 of FIG. 2), a third anchor (e.g., the third anchor 250 of FIG. 2), and a fourth anchor (e.g., the fourth anchor 270 of FIG. 2). The processor 120 may measure at least one of a first distance D1 to the first anchor 210, a second distance D2 to the second anchor 230, a third distance D3 to the third anchor 250, or a fourth distance D4 to the fourth anchor 270 via UWB communication. The processor 120 may obtain, from the vehicle 201, at least one of a first anchor distance D12 between the first anchor 210 and the second anchor 230, a second anchor distance D23 between the second anchor 230 and the third anchor 250, a third anchor distance D34 between the third anchor 250 and the fourth anchor 270, a fourth anchor distance D41 between the fourth anchor 270 and the first anchor 210, a fifth anchor distance D13 between the first anchor 210 and the third anchor 250, and a sixth anchor distance D24 between the second anchor 230 and the fourth anchor 270, or may measure such distances via UWB communication.

If the maximum value among the first distance D1 to the fourth distance D4 is greater than or equal to the maximum value among the first anchor distance D12 to the sixth anchor distance D24, the processor 120 may determine that the electronic device 101 is located outside the vehicle 201. Alternatively, if the maximum value among the first distance D1 to the fourth distance D4 is less than the maximum value among the first anchor distance D12 to the sixth anchor distance D24, the processor 120 may determine that the electronic device 101 is located inside the vehicle 201. When determining the maximum value, the electronic device 101 may take into account an error range of the first distance D1 to the fourth distance D4, and an error range of the first anchor distance D12 to the sixth anchor distance D24. The error range may be preset in the electronic device 101 or may be set by the user.

The processor 120 may proceed with operation 509 if the predetermined condition is satisfied, and may continuously proceed with operation 507 if the predetermined condition is not satisfied.

In operation 509, if the predetermined condition is satisfied, the processor 120 may perform UWB communication with the vehicle 201 according to a second scheme. The second scheme may be the TDOA scheme. For example, in operations 501 to 507 in which the electronic device 101 is determined as being located outside the vehicle 201, the processor 120 may perform UWB communication with the vehicle 201 according to the TWR scheme.

In operation 509 in which the electronic device 101 is determined as being located inside the vehicle 201, the processor 120 may perform UWB communication with the vehicle 201 according to the TDOA scheme. If the electronic device 101 is located outside the vehicle, the electronic device 101 may perform UWB communication according to the TWR scheme in order to measure the distance to the vehicle 201. If the electronic device 101 is located inside the vehicle 201, the electronic device 101 may perform UWB communication according to the TDOA scheme so as to reduce the amount of current consumed, rather than to accurately measure the distance since the purpose is maintaining communication with the vehicle 201.

Figure 6A:
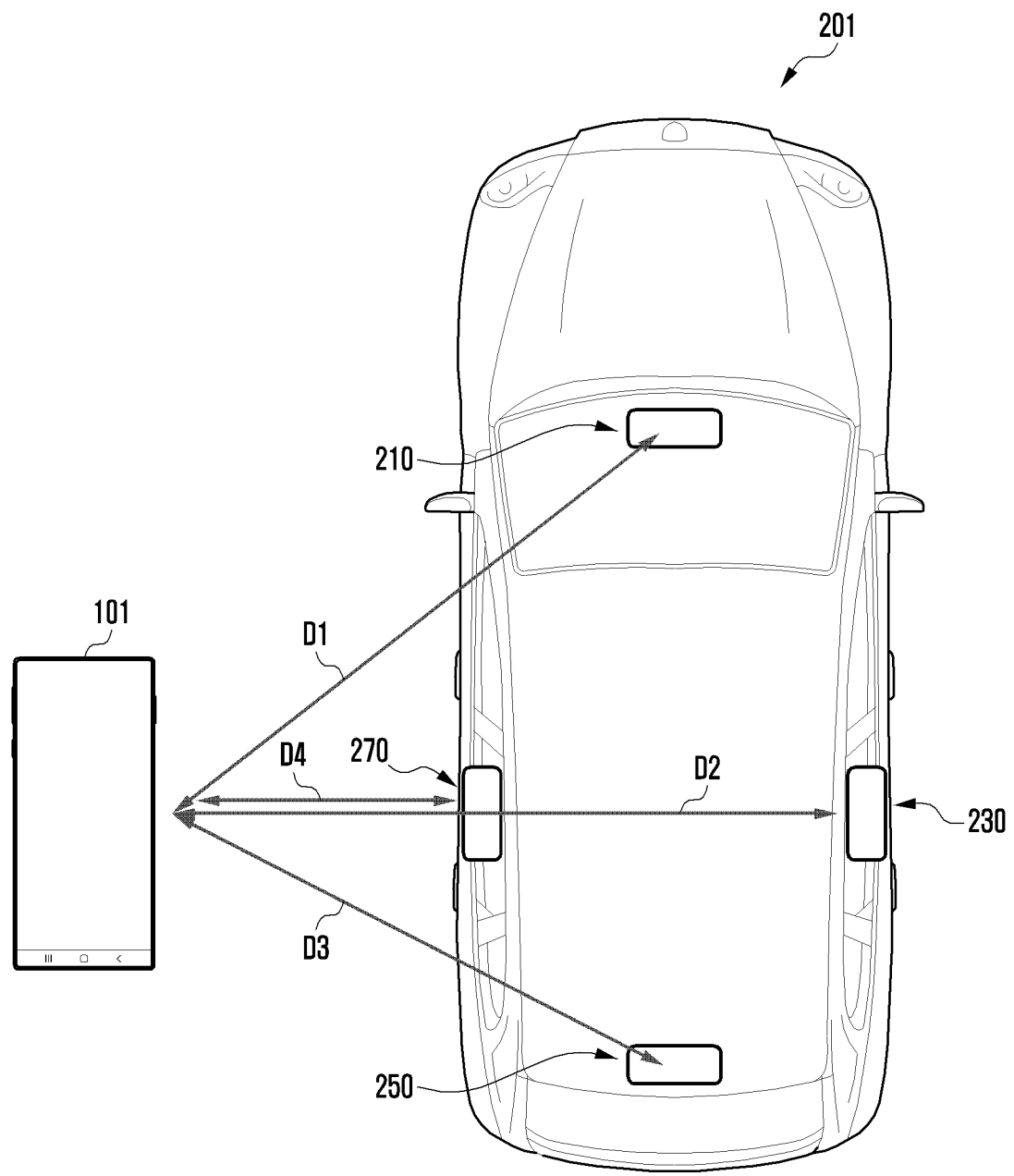
FIG. 6A is a diagram illustrating an example in which an electronic device is located outside a vehicle based on the distance to an anchor included in the vehicle according to an embodiment.

FIG. 6A is a diagram illustrating an example in which an electronic device is located outside a vehicle based on the distance to an anchor included in the vehicle according to an embodiment.

Referring to FIG. 6A, a vehicle (the vehicle 201 of FIG. 2) according to an embodiment may include a smart key system that detects that the driver who carries the smart key has requested a required action for a system embedded in the vehicle (e.g. opening a car door), and controls the operations of the vehicle according to the required action. Such smart key system may include an antenna for transmitting or receiving signals or a controller that controls overall operation of the vehicle 201. The vehicle 201 may include at least one of a first anchor (e.g., the first anchor 210 of FIG. 2), a second anchor (e.g., the second anchor 230 of FIG. 2), a third anchor (e.g., the third anchor 250 of FIG. 2), and a fourth anchor (e.g., the fourth anchor 270 of FIG. 2). Each of the first anchor 210 to the fourth anchor 270 may include an RF antenna that performs transmission or reception of RF signals with a smart key (e.g., the electronic device 101).

The electronic device (the electronic device 101) according to an embodiment may measure at least one of a first distance D1 to the first anchor 210, a second distance D2 to the second anchor 230, a third distance D3 to the third anchor 250, and a fourth distance D4 to the fourth anchor 270 via UWB communication. The electronic device 101 may obtain, from the vehicle 201, at least one of a first anchor distance D12 between the first anchor 210 and the second anchor 230, a second anchor distance D23 between the second anchor 230 and the third anchor 250, a third anchor distance D34 between the third anchor 250 and the fourth anchor 270, a fourth anchor distance D41 between the fourth anchor 270 and the first anchor 210, a fifth anchor distance D13 between the first anchor 210 and the third anchor 250, and a sixth anchor distance D24 between the second anchor 230 and the fourth anchor 270, or may measure such distances via UWB communication.

If the maximum value among the first distance D1 to the fourth distance D4 is greater than or equal to the maximum value among the first anchor distance D12 to the sixth anchor distance D24 (e.g., max[d1, d2, d3, d4]≥max[D12, D23, D34, D41, D13, D24]), it is determined that the electronic device 101 is located outside the vehicle 201.

Figure 6B:
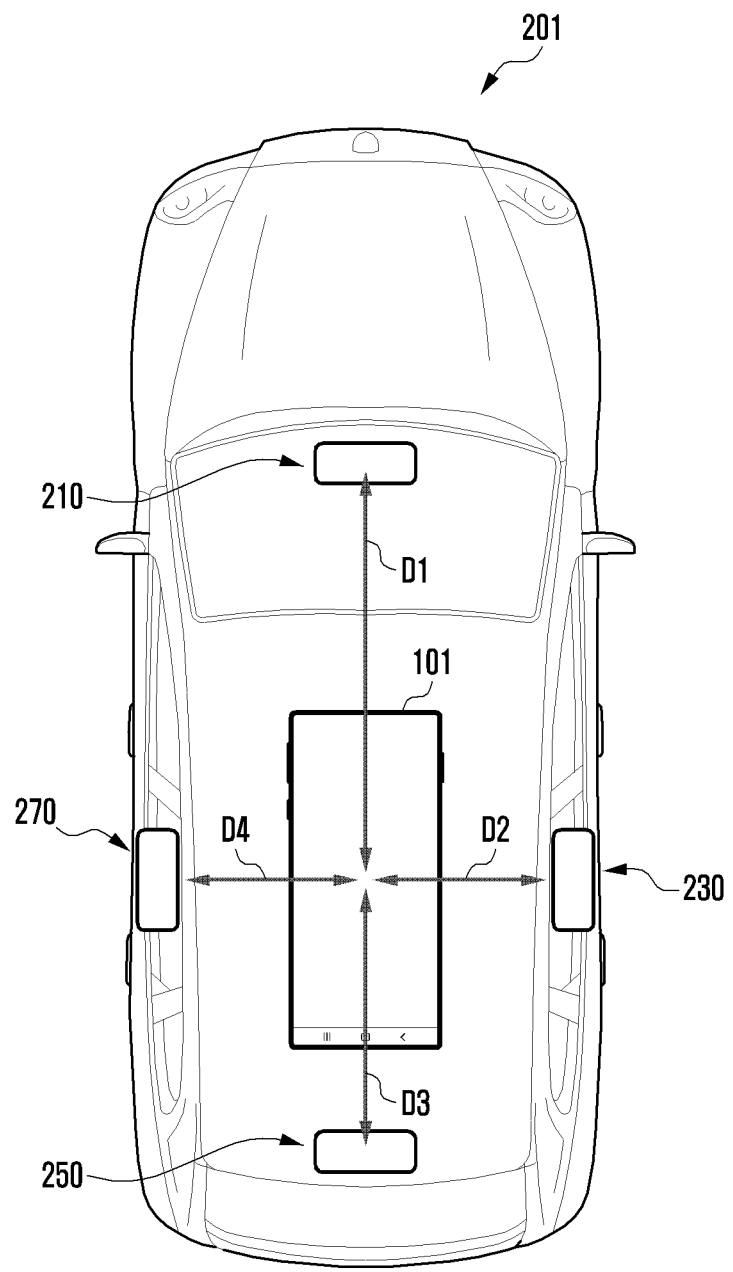
FIG. 6B is a diagram illustrating an example in which an electronic device is located inside a vehicle based on the distance to an anchor included in the vehicle according to an embodiment.

FIG. 6B is a diagram illustrating an example in which an electronic device is located inside a vehicle based on the distance to an anchor included in the vehicle according to an embodiment.

Referring to FIG. 6B, the electronic device 101 may measure at least one of a first distance D1 to the first anchor 210, a second distance D2 to the second anchor 230, a third distance D3 to the third anchor 250, and a fourth distance D4 to the fourth anchor 270 via UWB communication. The electronic device 101 may obtain, from the vehicle 201, at least one of a first anchor distance D12 between the first anchor 210 and the second anchor 230, a second anchor distance D23 between the second anchor 230 and the third anchor 250, a third anchor distance D34 between the third anchor 250 and the fourth anchor 270, a fourth anchor distance D41 between the fourth anchor 270 and the first anchor 210, a fifth anchor distance D13 between the first anchor 210 and the third anchor 250, and a sixth anchor distance D24 between the second anchor 230 and the fourth anchor 270, or may measure such distances via UWB communication.

If the maximum value among the first distance D1 to the fourth distance D4 is less than the maximum value among the first anchor distance D12 to the sixth anchor distance D24 (e.g., max[d1, d2, d3, d4]<max[D12, D23, D34, D41, D13, D24]), the electronic device 101 may determine that the electronic device 101 is located outside the vehicle 201.

Figure 7:
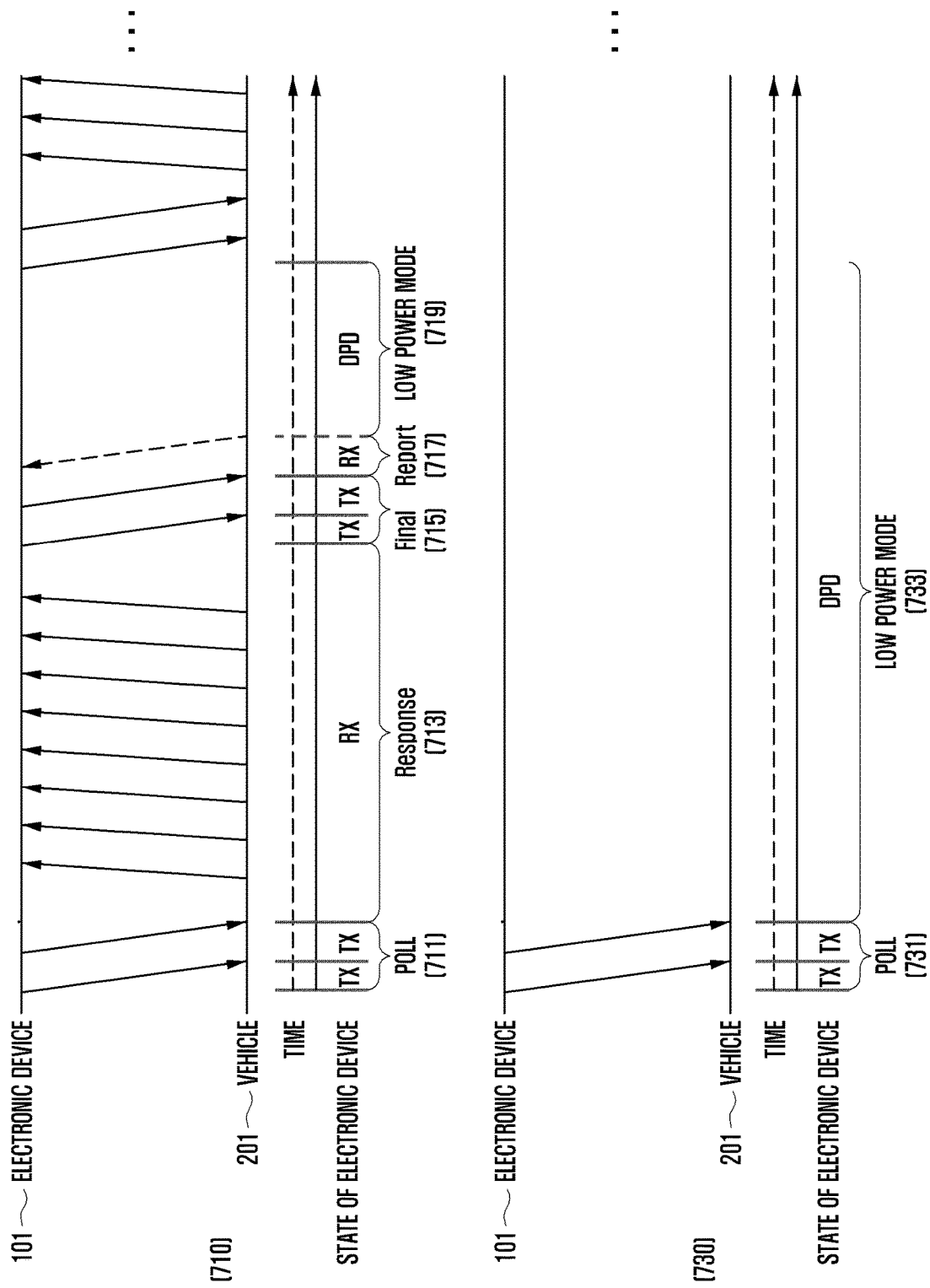
FIG. 7 is a diagram illustrating an example of comparing UWB communication schemes performed between an electronic device and a vehicle according to an embodiment.

FIG. 7 is a diagram illustrating an example of comparing UWB communication schemes performed between an electronic device and a vehicle according to an embodiment.

Referring to FIG. 7, according to the TWR scheme 710 (e.g., DS-TWR), an electronic device (e.g., the electronic device 101 of FIG. 1) according to an embodiment may transmit a Ranging Poll message 711 to the first anchor 210 to the fourth anchor 270 included in a vehicle (e.g., the vehicle 201 of FIG. 2). The first anchor 210 to the fourth anchor 270 may transmit a Ranging Response message 713 to the electronic device 101 in response to the Ranging Poll message. The electronic device 101 may transmit a Ranging Final message 715 to the first anchor 210 to the fourth anchor 270. At least one of the first anchor 210 to the fourth anchor 270 that receives the Ranging Final message 715 may measure the distance to the electronic device 101 based on the Ranging Final message 715, and may transmit a Report message 717 including the distance to the electronic device 101 to the electronic device 101.

A single interval may be a distance measurement cycle, and may refer to an interval at which the electronic device 101 transmits a Ranging Poll message. According to the TWR scheme 710, the electronic device 101 may transmit a message (e.g., Ranging Poll, Ranging Final) and may receive a message (e.g., Ranging Response, Report) during a single interval, and UWB communication may be activated while messages are transmitted and received. If transmission and reception of message(s) during the single interval is completed, the electronic device 101 may enter a low power mode 719. The low power mode may be when UWB communication is deactivated.

According to an embodiment, if the first anchor 210 to the fourth anchor 270 included in the vehicle 201 transmit the Ranging Poll message, and the electronic device 101 transmits Ranging Response message to the first anchor 210 to the fourth anchor 270 in response to the Ranging Poll message, and the first anchor 210 to the fourth anchor 270 transmit the Ranging Final message to the electronic device 101, and the Report message may be omitted. The device that receives the Ranging Final message is capable of measuring the distance to the counterpart device, and thus, if the electronic device 101 receives the Ranging Final message, the Report message may be omitted. Alternatively, although the electronic device 101 receives the Ranging Final message, the electronic device 101 may transmit the Report message including the distance to the vehicle 201 to the first anchor 210 to the fourth anchor 270.

According to the TDOA scheme 730, the electronic device 101 may transmit a Ranging Poll message 731 to the first anchor 210 to the fourth anchor 270 included in the vehicle 201. The first anchor 210 to the fourth anchor 270 may measure the distance to the electronic device 101 using the differences in time at which the Ranging Poll message is received at the anchors. The first anchor 210 to the fourth anchor 270 may be connected to each other via a wire or wirelessly, and thus, the anchors may be synchronized in time. According to the TDOA scheme 730, the electronic device 101 may need to activate UWB communication while transmitting the Ranging Poll message. After transmitting the Ranging Poll message during a single interval, the electronic device 101 may enter the low power mode 733.

The TWR scheme 710 that activates UWB communication for both message transmission and reception may consume a larger amount of power than the TDOA scheme 730 that activates UWB communication only for message transmission.

Figure 8:
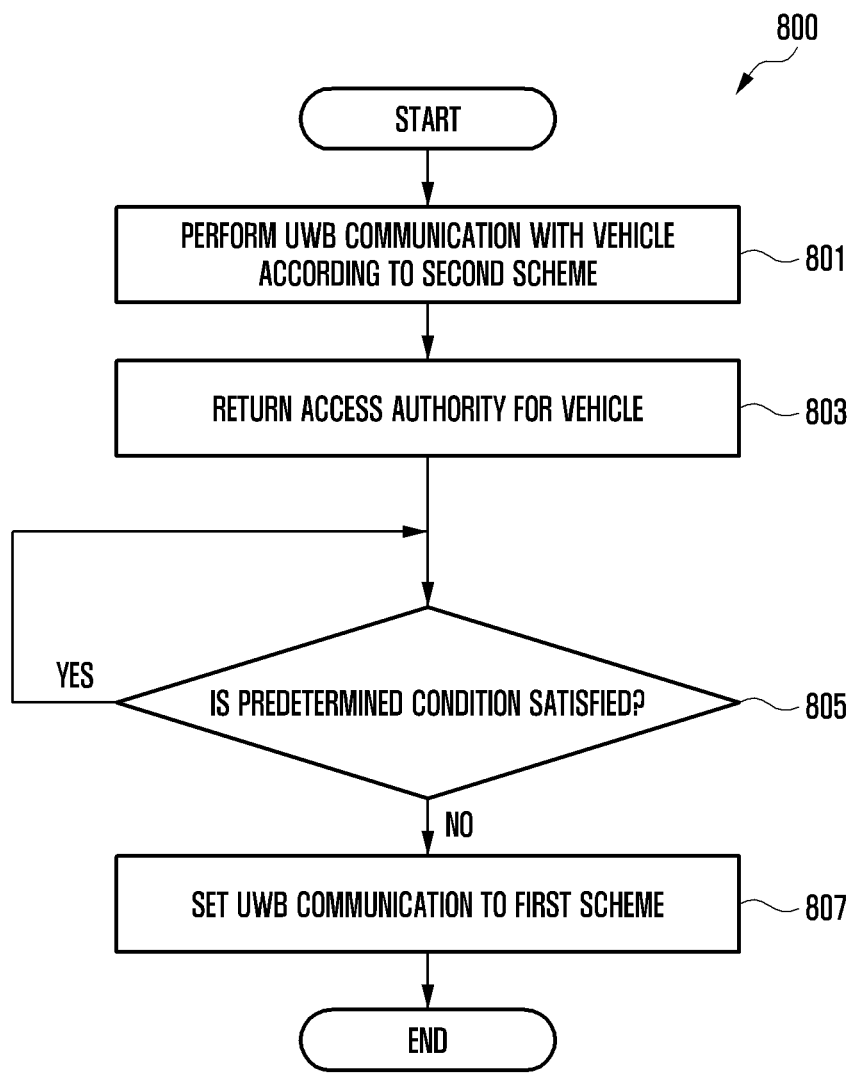
FIG. 8 is a flowchart illustrating a method of changing a UWB communication scheme by an electronic device according to an embodiment.

FIG. 8 is a flowchart 800 illustrating a method of changing a UWB communication scheme by an electronic device according to an embodiment.

Referring to FIG. 8, in operation 801, a processor (e.g., the processor 120 of FIG. 1) of an electronic device (e.g., the electronic device 101 of FIG. 1) according to an embodiment may communicate with a vehicle (e.g., the vehicle 201 of FIG. 2) according to a second scheme via UWB communication. The second scheme may be the TDOA scheme. For example, if it is determined that the electronic device 101 is located inside the vehicle 201, the processor 120 may perform UWB communication with the vehicle 201 via a communication module (e.g., the communication module 190 of FIG. 1) according to the TDOA scheme that reduces the amount of power consumed.

In operation 803, the processor 120 may return access authority for the vehicle 201. The access authority for the vehicle 201 may be the authority to open the door of the vehicle 201, or the authority to turn on the vehicle 201. If it is determined that the electronic device 101 turns off the vehicle 201 or lock the doors, the processor 120 may return the access authority for the vehicle 201.

In operation 805, the processor 120 may determine whether a predetermined condition is satisfied. The predetermined condition may correspond to whether the electronic device 101 is located inside the vehicle 201. For example, the predetermined condition may be when information indicating that the electronic device 101 is located inside the vehicle is received from the vehicle 201, when the electronic device 101 is determined as being connected to a connection system of the vehicle 201, and when the electronic device 101 is determined as being located inside the vehicle based on a distance between anchors included in the vehicle 201. Operation 805 is the same as, or similar to, operation 507 of FIG. 5, and thus, detailed descriptions thereof may be omitted.

The processor 120 may proceed with operation 807 if the predetermined condition is not satisfied, and may continuously proceed with operation 805 if the predetermined condition is satisfied.

In operation 807, if the predetermined condition is not satisfied, the processor 120 may perform UWB communication with the vehicle 201 according to a first scheme. The first scheme may be the TWR scheme. If the electronic device 101 is located outside the vehicle 201, the processor 120 may measure the distance to the vehicle 201 according to the first scheme. Operation 807 is the same as, or similar to, operation 301 of FIG. 3 or operation 501 of FIG. 5, and thus, detailed descriptions thereof will be omitted. For example, operation 807 corresponds to the case in which a user has locked the doors of the vehicle 201 and has moved away from the vehicle 201. In contrast, operation 501 corresponds to when the user approaches the vehicle 201.

An operation method of an electronic device (e.g., the electronic device 101 of FIG. 1) according to an embodiment may include an operation of performing UWB communication with a plurality of anchors (e.g., the first anchor 210 to the fourth anchor 270 of FIG. 2) included in a vehicle (e.g., the vehicle 201 of FIG. 2) via a communication module (e.g., the communication module 190 of FIG. 1) of the electronic device according to a first scheme, an operation of determining whether the distance to a vehicle falls within a predetermined distance by measuring a distance via the UWB communication, an operation of determining whether a predetermined condition is satisfied if the distance falls within the predetermined distance; and an operation of changing the UWB communication scheme from the first scheme to a second scheme if the predetermined condition is satisfied.

The predetermined condition may be to determine whether the electronic device is located inside the vehicle.

The predetermined condition may include when information associated with whether the electronic device is located inside the vehicle is received from the vehicle, when the electronic device is determined as being connected to a connection system of the vehicle, and when the electronic device is determined as being located inside the vehicle based on the distance between anchors included in the vehicle.

The operation of determining whether the predetermined condition is satisfied may include an operation of determining that the predetermined condition is satisfied by receiving a signal indicating that the electronic device is located inside the vehicle from the vehicle if the vehicle determines that the electronic device is located inside the vehicle or if the strength of an RSSI that an anchor included in the vehicle receives from the electronic device corresponds to a set value.

The operation of determining whether the predetermined condition is satisfied may include an operation of determining that the electronic device is connected to a connection system of the vehicle via a wire or wirelessly.

The operation of determining whether the predetermined condition is satisfied may include an operation of measuring a first distance to a first anchor included in the vehicle or measuring a second distance to a second anchor via the UWB communication, an operation of obtaining an anchor distance between the first anchor and the second anchor from the vehicle, or measuring via the UWB communication, and an operation of determining that the electronic device is located inside the vehicle if the maximum value among the first distance or the second distance is less than the anchor distance.

The operation of determining whether the predetermined condition is satisfied may include an operation of determining that the electronic device is located outside the vehicle if the maximum value among the first distance or the second distance is greater than or equal to the anchor distance.

The operation of determining whether the predetermined condition is satisfied may include an operation of determining that the electronic device is located inside the vehicle if the maximum value among the first distance or the second distance is less than the anchor distance, or an operation of determining that the electronic device is located outside the vehicle if the maximum value among the first distance or the second distance is greater than or equal to the anchor distance, while taking into account an error range of the first distance, the second distance, and/or the anchor distance.

The first scheme may be a two way ranging (TWR) scheme, and the second scheme may be a time difference of arrival (TDOA) scheme.

The method may include an operation of determining whether the predetermined condition is satisfied while performing UWB communication with the plurality of anchors included in the vehicle according to the second scheme, and an operation of changing the UWB communication scheme from the second scheme to the first scheme if the predetermined condition is not satisfied.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The various embodiments of the disclosure provided in the specification and the accompanying drawings are just predetermined examples for easily describing the technical contents of the disclosure and helping understanding of the disclosure, but the disclosure is not limited thereto. Therefore, it should be construed that the scope of the disclosure includes all modifications or modified forms obtained based on the technical idea of the disclosure, in addition to the embodiments disclosed herein.

What is claimed is:

1. An electronic device comprising:
a communication module;
memory storing instructions; and
a processor,
wherein the instructions, when executed by the processor, cause the electronic device to:
perform UWB communication with a plurality of anchors included in a vehicle via the communication module according to a first scheme,
determine whether a predetermined condition for determining that the electronic device is located inside the vehicle is satisfied, and
change, based on determining that the predetermined condition is satisfied, UWB communication scheme from the first scheme to a second scheme,
wherein determining whether the predetermined condition is satisfied is based on a first distance between the electronic device and a first anchor of the plurality of anchors, a second distance between the electronic device and a second anchor of the plurality of anchors, and an anchor distance between the first anchor and the second anchor.

2. The electronic device of claim 1, wherein the instructions, when executed by the processor, cause the electronic device to:
determine that predetermined condition is satisfied, when a maximum value among the first distance and the second distance is less than the anchor distance.

3. The electronic device of claim 2, wherein, the instructions, when executed by the processor, cause the electronic device to determine that predetermined condition is not satisfied, when the maximum value among the first distance and the second distance is greater than or equal to the anchor distance.

4. The electronic device of claim 3, wherein the instructions, when executed by the processor, cause the electronic device to determine that the electronic device is located inside the vehicle when the maximum value among the first distance and the second distance is less than the anchor distance, or determine that the electronic device is located outside the vehicle when the maximum value among the first distance and the second distance is greater than or equal to the anchor distance.

5. The electronic device of claim 1, wherein the first scheme is a two way ranging (TWR) scheme, and the second scheme is a time difference of arrival (TDOA) scheme.

6. The electronic device of claim 1, wherein the instructions, when executed by the processor, cause the electronic device to:
determine whether the predetermined condition is satisfied while performing the UWB communication with the plurality of anchors included in the vehicle according to the second scheme, and
when the predetermined condition is not satisfied, change the UWB communication scheme from the second scheme to the first scheme.

7. An operation method of an electronic device, the method comprising:
performing UWB communication with a plurality of anchors included in a vehicle via a communication module of the electronic device according to a first scheme;
determining whether a predetermined condition for determining that the electronic device is located inside the vehicle is satisfied; and
changing, based on determining that the predetermined condition is satisfied, UWB communication scheme from the first scheme to a second scheme,
wherein determining whether the predetermined condition is satisfied is based on a first distance between the electronic device and a first anchor of the plurality of anchors, a second distance between the electronic device and a second anchor of the plurality of anchors, and an anchor distance between the first anchor and the second anchor.

8. The method of claim 7, wherein the determining of whether the predetermined condition is satisfied further comprises:
determining that the predetermined condition is satisfied, when a maximum value among the first distance and the second distance is less than the anchor distance.

9. The method of claim 8, wherein the determining of whether the predetermined condition is satisfied further comprises determining that predetermined condition is not satisfied, when the maximum value among the first distance and the second distance is greater than or equal to the anchor distance.

10. The method of claim 9, wherein the determining of whether the predetermined condition is satisfied further comprises determining that the electronic device is located inside the vehicle when the maximum value among the first distance and the second distance is less than the anchor distance, or determining that the electronic device is located outside the vehicle when the maximum value among the first distance and the second distance is greater than or equal to the anchor distance.

11. The method of claim 7, wherein the first scheme is a two way ranging (TWR) scheme, and the second scheme is a time difference of arrival (TDOA) scheme.

12. The method of claim 7, further comprising:
determining whether the predetermined condition is satisfied while performing the UWB communication with the plurality of anchors included in the vehicle according to the second scheme; and when the predetermined condition is not satisfied, changing the UWB communication scheme from the second scheme to the first scheme.

* * * * *